June 24, 1958 — F. H. FULLER — 2,839,836
GAUGES FOR INDIVIDUAL TURBINE BLADES
Filed March 8, 1954 — 3 Sheets-Sheet 1

INVENTOR.
FRED H. FULLER
BY
Reynolds, Beach + Christensen
ATTORNEYS

June 24, 1958  F. H. FULLER  2,839,836
GAUGES FOR INDIVIDUAL TURBINE BLADES
Filed March 8, 1954  3 Sheets-Sheet 3

INVENTOR.
FRED H. FULLER
BY
Reynolds, Beach & Christensen
ATTORNEYS

United States Patent Office

2,839,836
Patented June 24, 1958

2,839,836

GAUGES FOR INDIVIDUAL TURBINE BLADES

Fred H. Fuller, Seattle, Wash., assignor to Boeing Airplane Company, Seattle, Wash., a corporation of Delaware Application March 8, 1954, Serial No. 414,709

17 Claims. (Cl. 33—174)

This invention relates indirectly to the blades of gas turbines such as are used in the turbine sections of continuous combustion turbine engines, for instance, in the jet engines used for aircraft propulsion. More especially, this invention relates to the gauging of such individual turbine blades prior to machining them, and before their assembly into a turbine wheel.

These blades are individually forged, of a very hard, tough metal, such as Stellite, and are individually machined about the shank, and then the correct number of blades is assembled in circular form with their airfoil portions radiating outwardly, and the shanks of the several blades are welded together to make up a halo. This halo constitutes the periphery of the turbine wheel. Running at speeds of the order of 36,000 R. P. M., and exposed to high speed impingement by the jet stream at very high temperatures, not only must the individual airfoils be substantially perfect and identical in contour and in orientation, but also the halos must be very accurately balanced, dynamically as well as statically. All blades must have their airfoils set at exactly the same angles as all others, and all must be spaced exactly the same distance apart at all points, within very small tolerances. While the halo, naturally, must be made with great care, and gauged carefully, no amount of care in the assembly of the halo can atone for inaccuracy in individual blades.

Each individual forged blade is machined prior to assembly to form flat opposite faces on its shank, which are relatively inclined to the angles of the radial planes subtended by the arc occupied by the blade in the finished halo. Thereby in their assembly the adjoining faces of successive blade shanks abut exactly, and fix the orientation of the blade's airfoil radially of the halo, and rotationally about the airfoil's longitudinal axis. If any such machined face is not at the correct angle to the airfoil, the airfoil, even if correct in contour, cannot be oriented correctly, by abutment of its shank to the adjoining shanks, relative to the other airfoils in the finished halo. It will be canted with respect to the true radius of the halo which it should occupy, or will be rotated about its longitudinal axis more or less than the other airfoils, or both. If any such shank lacks enough metal that its machined face may be machined perfectly true and flat over its entire area, the blade may rock relative to an adjoining blade, and by the amount of metal that is deficient will be out of balance with the other baldes. It is inaccuracies of such sorts that, magnified by the extreme operating conditions, cause faulty balance and untrue running of the finished turbine wheel. Since a large amount of highly skilled labor, and expensive material, are incorporated in a turbine wheel of this type, it is clear that it is preferable to discover and to reject faulty blades, blades which are so inherently inaccurate that a satisfactory blade cannot be made from them, at the earliest stage possible in the manufacture of the turbine wheel. It is the general object of this invention so to do, namely, to discover when a forged blade, before machining has been performed thereon, lacks the capacity to make an acceptable blade after machining.

More particularly, it is an object of this invention to determine the inherent correctness of the airfoil contour at stations near its tip and its base, respectively, the correctness of the angularity of the airfoil's longitudinal axis relative to its shank, and whether the shank contains sufficient metal, correctly located, that when it is machined it will match like blade shanks in all respects, including weight, and will orient its airfoil correctly and uniformly with respect to like airfoils of other blades when assembled into a halo.

It should be made clear that imbalance and rough running are not per se the primary effects to be avoided. They are the causes of other, more basic, faults which must be avoided, and are as well highly undesirable in themselves. Primarily, defective halos, or halos which incorporate defective blades, do not maintain the designed power output of their engine, making it either of lower or higher power output, and tend to destroy themselves from forces that arise from their lack of uniformity.

In a specific small engine of this type the rated power output is 175 H. P., and the turbine is designed to correspond. Actually the output has ranged from 140 to 200 H. P. Obviously the lower output is undesirable, and although the attainment of a higher-than-rated output might be considered desirable, it is in fact also objectionable, in that the engine as a whole, and the turbine specifically, tend to burn out rapidly. Only by maintaining the turbine of such quality that the power output can be maintained substantially constant at the designed rating, can its useful life be prolonged, and the engine made dependable. In addition, the wracking effects of dynamic unbalance, the vibration, etc., are clearly recognized.

Because it has been recognized that the foundation of a smoothly running, accurately formed, and evenly balanced turbine wheel lies in the accuracy of the individual blades, it has been the practice heretofore to spot-check such blades. Not all blades have been checked or gauged individually, simply because the gauging methods and devices heretofore available to do the job as accurately as is necessary were so time-consuming and tedious that is was physically and economically impossible to do so. Such former gauging operations have involved in effect a scribing procedure, transferring the contour of the blade's airfoil at selected stations in its length onto a glass plate, and then comparing the scribed contour with a standard contour for the given station. One skilled operator and expensive machines could, by such procedure, gauge the airfoil contours of forty blades only in one day. This, of course, was so slow and costly that it prohibited more than spot-checking, and permitted defective blades to get into the halo unchecked. Also, it checked only the airfoil contours, and not the orientation of the airfoil relative to the shank, nor the presence or absence of sufficient metal, correctly located, in the shank to enable its machining accurately on its two faces.

It is a further object of this invention to provide a gauge and a gauging procedure so simple and rapid, yet withal so accurate, that it is feasible to gauge each and every blade in production manufacture. By comparison with the spot-checking of forty blades a day by the older procedure, it has been found possible with the present gauge for one operator to check one hundred blades an hour. Moreover, the gauge of this invention releases for other uses several expensive machines and pieces of equipment used in the older procedures.

Reference has been made to the need for great accuracy in the several parts of a blade and in the orientation of these parts each relative to other parts. There is, nevertheless, a small tolerance permissible in certain measurements. Sometimes it is found that an airfoil contour is acceptable, but that it is oriented as a whole incorrectly relative to the shank. Since the shank is the part to be machined (the airfoil needing no more than polishing, at most) it may happen that there is sufficient metal in the forged shank to bring the machined shank into proper orientation with the airfoil, provided the shank be machined more deeply at one edge than at its other, that is, in correct orientation with the airfoil, and not merely by removal of metal to a uniform depth throughout. If the blade is fixed in one unchangeable position during gauging, this may not be discovered, and a usable forged blade may be rejected, with an appreciable loss of its not inconsiderable value. A further object of this invention is to provide, in such a gauge, means for effecting limited adjustment of a blade when it is in the gauging position—particularly about its longitudinal axis—so that its capacity for use within the permissible limits of tolerance may be determined by such adjustment.

According to the present invention, and briefly stated, fixed blade-locating devices, which engage primarily the shank, and which constitute datum points or lines, are all mounted upon a fixed support, and cooperating yieldable blade-locating devices are located upon the fixed support or upon certain shiftable supports, whereby they are movable relative to the fixed blade-locating devices. There are two shiftable supports, guided on the fixed support, on which shiftable supports are carried certain contact gauge elements. The gauge elements are necessarily oriented correctly relative to the blade-locating devices by this relationship of the gauge's parts. The movement of the shiftable supports is arranged to bring the contact gauge elements into contact with a standard blade's airfoil at a number of predetermined gauging points, and to indicate, as a result, zero departure from the standard, or if the blade departs to indicate at what stations and to what extent it departs, so that it may be determined whether or not the airfoil as a whole and at each individual gauging point is within the permitted tolerances. Not only does this gauge the shape or contour of the airfoil portion of the blade, but in addition, since the shank is accurately located by the blade-locating devices with relation to the gauging elements, this determines likewise and at the same time the relationship of the shank to the airfoil. It will be remembered that if this relationship is incorrect, then the blade is defective, notwithstanding that its airfoil portion may be correct at every gauge point.

The invention will be better understood from the accompanying drawings in conjunction with this specification, and is shown in the accompanying drawings in a form such as is presently preferred by me. The features of novelty which are believed to distinguish this invention will be made clear in the appended claims.

Figure 2:
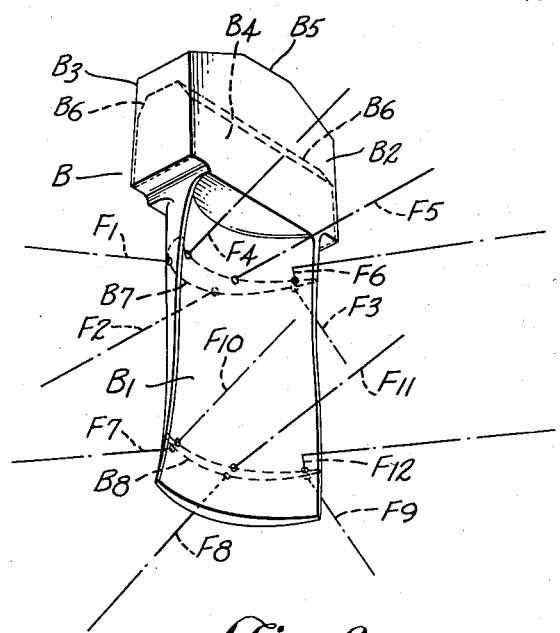
Figure 2 is an enlarged isometric view of an individual blade before and after machining, but indicating the several gauge points and diagrammatically the manner in which the contact gauge elements touch at these several gauge points.

The turbine blade is shown in full lines in Figure 2 in its forged shape, and in dotted lines in its machined shape; it is not thus machined until after the gauging operation, to be described hereinbelow, has been performed. One of the objects of the gauging is to determine whether there is enough metal, properly located, particularly in the shank of the blade, to permit the machining operation which is indicated. The blade as a whole is indicated at B, and consists of the airfoil section B1, whereon the hot gases impinge in use, and the shank B2. The airfoil portion B1 must be completed in the forging operation, other than merely superficial polishing, but it is the shank portion B2 which must be machined from the full line contour, indicated at B3, to the dotted line form. It will be observed that the planar faces of the shank B2, namely, B4 and the face opposite it, are very slightly angled with respect to one another. Likewise, the end surface B5, or base of the shank, is beveled or chamfered as indicated at B6 in the machined blade, for subsequent reception of weld metal as the blades are welded into a halo, and the halo is welded upon a turbine wheel.

It is safe to assume that if a selected number of gauge points at a station B7, adjacent the root of the airfoil portion B1, and a similar number at a station B8, adjacent the tip of the airfoil section, and in each instance both on the convex and concave sides of the respective stations, are found to be accurate, the blade as a whole will be accurate. Accordingly, some twelve such gauge points are selected, and the gauging is done in effect by comparison of the pattern defined by contact fingers engaged at such points with the contour of a standard blade at the same points.

Before it is possible to apply contact gauge fingers or the like to these several gauging points, it is necessary to locate the blade accurately in position, and because it is desired to gauge primarily the shank and its positional relation to the airfoil section, the blade-locating means engage in large measure with the shank. Such blade-locating devices are divided in turn into those which locate the blade longitudinally of its axis and those which locate it transversely of that axis.

Figure 3:
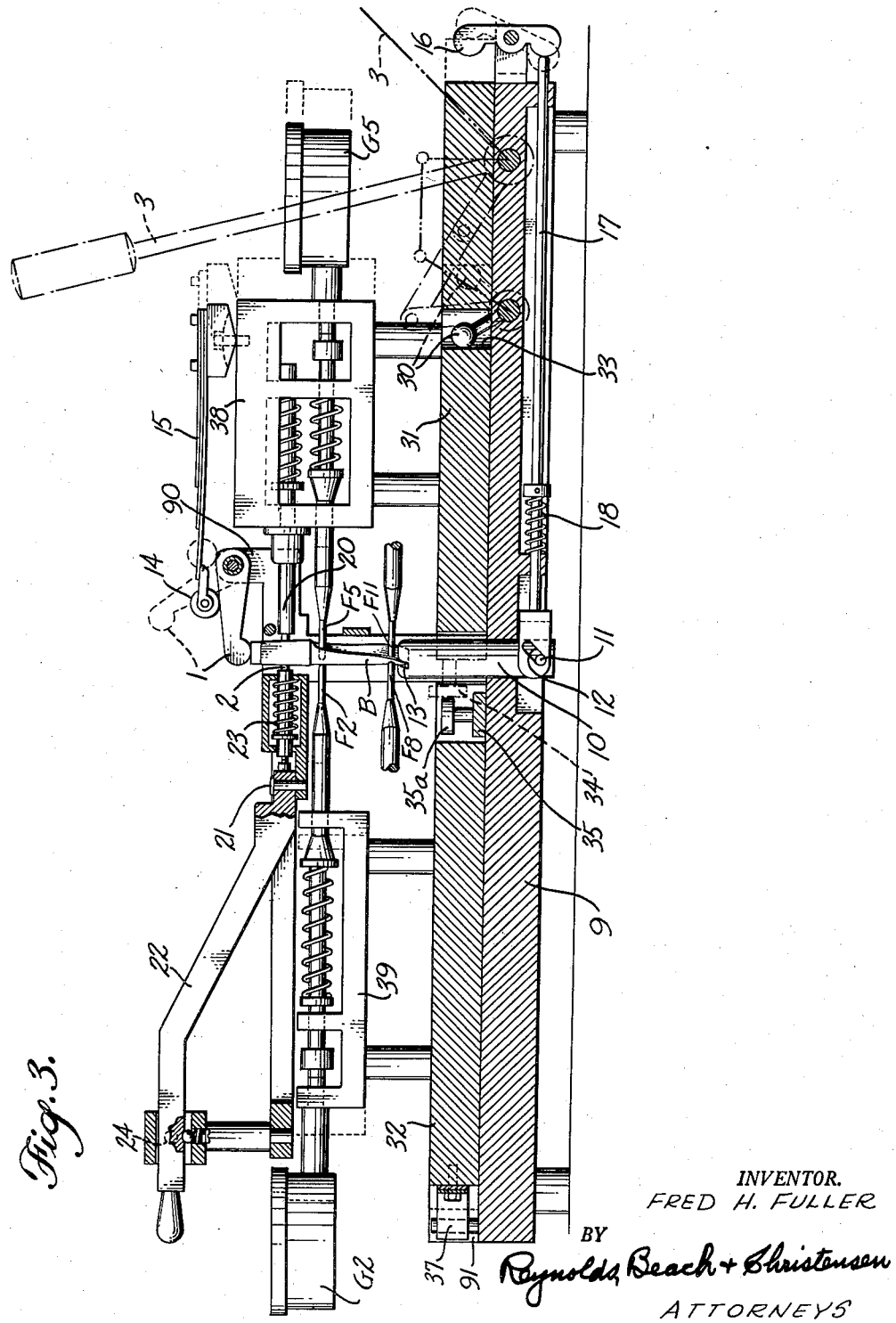
Figure 3 is an enlarged longitudinal sectional view through the gauge as a whole, the line of section being approximately indicated at 3—3 in Figure 1.
Figure 4:
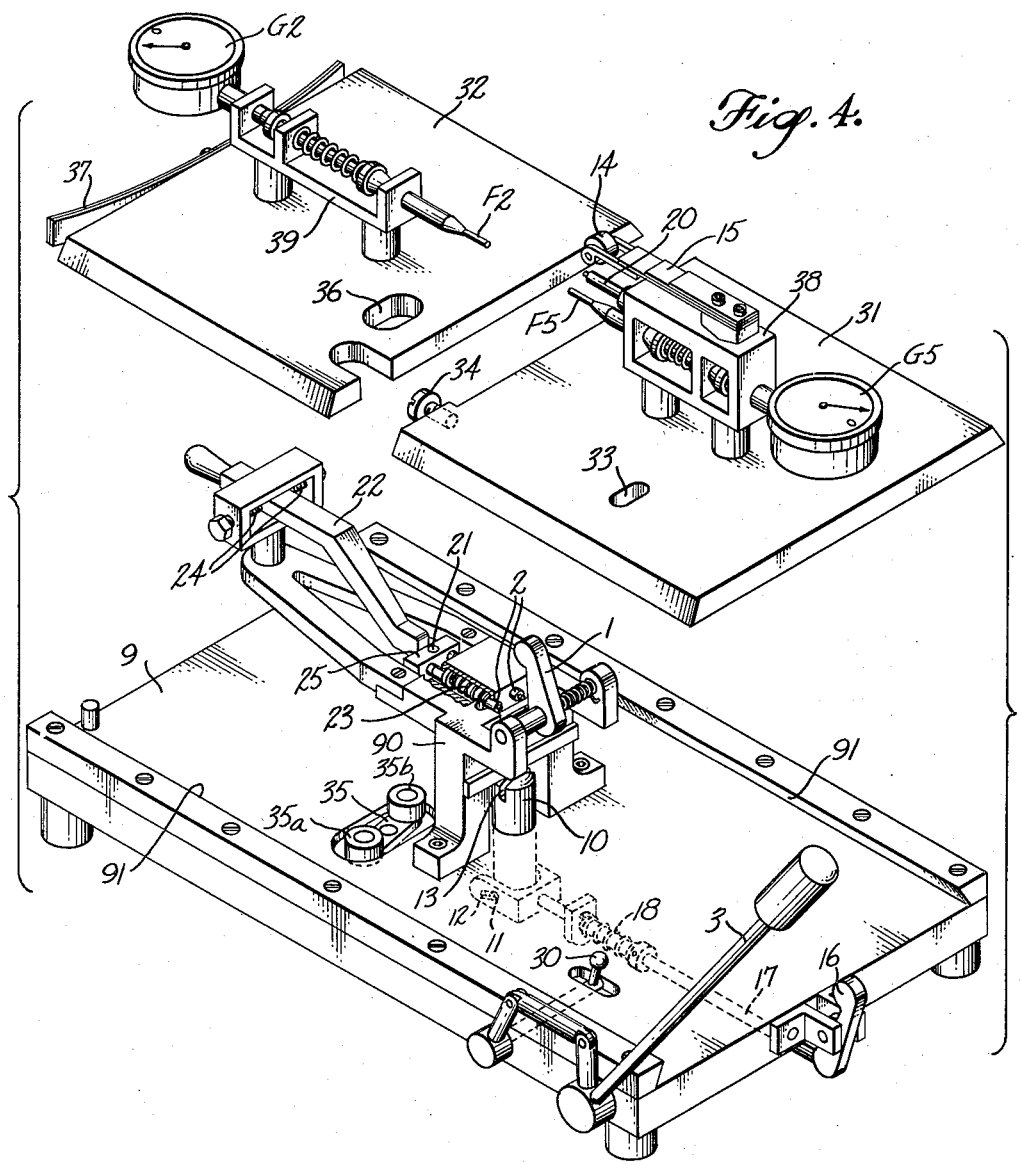
Figure 4 is an exploded isometric view, illustrating the three principal subassemblies, but with most of the gauging elements omitted for greater clarity of illustration.

Referring to Figures 3 and 4, a vertically disposed pin 10, although it is mounted and guided for vertical movement in a fixed support 9, may be considered as fixed in its lowered position during gauging, since it is stopped in that position by the cross pin 11 in a cam slot 12. This pin 10 may be slotted in its upper end, as indicated at 13, for the reception of the tip of a blade, but with ample space for movement of the blade within the slot 13, about the blade's longitudinal axis.

The blade is inverted during gauging, and the lower edge or base of its shank is engaged by a rocking arm 1, which normally is spring-held upraised, in the dotted line position of Figure 3 or the full line position of Figure 4. It is pivotally mounted upon a bracket 90 which is fixed upon the fixed support 9, approximately midway between the support's ends. However, this rocking arm 1 may be rotated about its pivot and pressed downwardly against the blade's shank by a longitudinally movable follower 14, strongly spring-pressed downwardly by the spring 15, and movable longitudinally with one of the shiftable supports, as will be explained in greater detail hereinafter.

The fixed pin 10 constitutes a datum point, and cooperates with the yieldingly downwardly pressed rocking arm 1 to locate the blade B in an exact position in the direction of the blade's length.

The transverse locating elements include three contact members which cooperate to define a triangle of support, and which engage opposite faces of the shank. A pair of spring-pressed pins 2 are guided in the bracket 90 so that they project towards, but during gauging are fixed in position with respect to, the shank of a blade in gauging position. They define a fixed datum line. A pin 20, likewise spring-urged toward the blade, is supported upon one of the shiftable supports in position where upon movement of the shiftable support to its final position, the pin 20 will engage the face of the shank which is opposite that face engaged by the two fixed pins 2, and preferably intermediate the two fixed pins, and thus will cooperate with the fixed pins 2 to locate the shank of the blade in a precise orientation, transversely of and rotationally about the blade's longitudinal axis. Since the blade's tip is held with reasonable accuracy in the slot 13, and may be shifted slightly therein by reason of the contact of the gauging elements with the airfoil portion B1, the locating means described will hold the blade in the intended gauging position with great accuracy.

The fixed support 9 is formed with guideways 91 at its opposite edges, in which are guided two shiftable supports or plates 31 and 32. The plate 31 is engageable by a short actuator arm 30, engageable within a slot 33 so that when the actuator arm 30 is rocked, through the connections illustrated best in Figure 4 by the actuator lever 3 the shiftable support 31 will be shifted inwardly towards the opposite shiftable support 32, or outwardly away from the latter. The inner edge of the shiftable support 31 is provided with an adjustable abutment 34 which, as the support 31 approaches the inner end of its movement, will engage an abutment 35a upon a rocking lever 35, and thereby will cause reverse movement of an abutment 35b on the opposite end of that rocking lever. The abutment 35b, being closely received within a slot 36 of the shiftable support 32, will cause inward movement of the latter support, coincidentally with the final inward movement of the support 31, until contacting stop means terminate such inward movement of both supports. A leaf spring 37, secured between its ends to the shiftable support 32, reacting at its ends from the fixed support 9, and stressed by shifting of the support 32 inwardly, will cause reverse or outward movement of the support 32 when outward movement of the support 31 has relieved the pressure of abutment 34 upon abutment 35a.

The shiftable support 31 carries a bracket 38 in which is supported and guided the single spring-pressed pin 20 which constitutes a part of the transverse blade-locating means. This same bracket 38 also supports the spring 15 which carries the roller 14, the function of which, as has already been described, is to press the rocking arm 1 downwardly upon the base of the blade's shank when inward movement of the support 31 rolls the roller 14 along the rocking arm 1. These particular elements, and these only of the blade-locating devices, are carried upon a movable support. All other parts of the blade-locating means are carried upon the fixed support, and these two which are carried on the shiftable support are yieldable so as to cooperate with the fixed supports, namely the pin 10 and the pair of pins 2, on the fixed support.

In addition, the various gauging and indicating devices are carried upon the respective shiftable supports 31 and 32. By way of example, and with reference to Figure 4, a contact finger F2 is supported and guided in a bracket 39 upstanding above the shiftable support 32, and is operatively connected with an indicator or gauge element G2. In like fashion a contact finger F5 is yieldably and slidably supported upon the bracket 38 upstanding above the shiftable support 31, and it is operatively connected to a gauge element G5. These two fingers F2 and F5 are directly opposite one another, and these particular ones are located to engage a properly located blade, approximately midway between the edges of the blade, at the station B7, the first finger at the convex side of the blade, and the second at the concave side thereof, as indicated diagrammatically in Figure 2.

Figure 1:
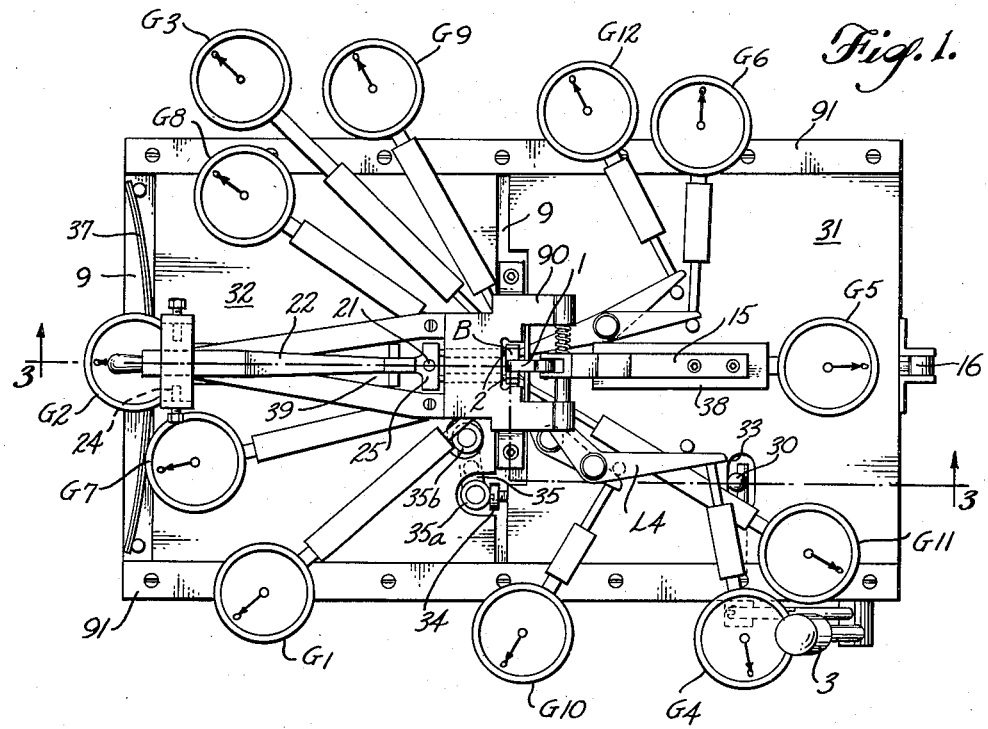
Figure 1 is a general plan view of the gauge.

Because the blade is very small it is difficult to locate all fingers so that they may thus directly contact the gauge, and it is necessary in some instances to resort to rocking levers connecting contact points which touch the blade at the proper gauge points, and the corresponding gauges or indicators. Thus, for example, in Figure 1, a rocking lever L4 is shown as operatively connecting a contact finger (not shown) and a corresponding gauge G4. The several gauges and contact fingers are indicated with appropriate subscripts from 1 to 12, and corresponding letters, so that they may be readily identified. In general, the gauging elements which contact the concave face of the airfoil are carried upon the shiftable support 31, and those which contact the convex face of the airfoil are carried upon the shiftable support 32.

The procedure is to drop a blade, with its tip downwardly, into the gauging station so that its tip rests in the slot 13, and then to rock the actuator lever 3 from the position indicated at the right in Figure 3 to the position indicated at the left. This accomplishes inward sliding of the shiftable support or plate 31, and in the final stages of that inward movement it causes also the inward movement of the shiftable support 32. Parts are so accurately made, or are so accurately adjustable, that when the two plates reach the limit of their respective inward movements the finger 20, in cooperation with the pair of fingers 2, will have located the blade accurately in a position transverse to its axis, and the rocking arm 1 will have been swung downwardly to locate the blade, in conjunction with the pin 10, in an accurate position longitudinally of its longitudinal axis. Likewise, each of the gauge fingers F1 and F12 will have come into contact with the blade at the proper gauge points, in the event the blade is accurately made and oriented. If the blade is not accurately made, the extent, direction, and point of departure will be indicated on the respective gauges G1 to G12. These may be marked with the limits of tolerance, plus and minus. Occasionally it may happen that a blade registers inaccurate beyond the limits of tolerance, but if the blade were to be reoriented, as by being rotated slightly about its longitudinal axis, it would be found to be accurate within the prescribed tolerances. In order to permit such rotation of a located blade, the pair of pins 2, although fixed during any given gauging operation, are relatively and mutually oppositely adjustable in the direction of their length. To this end a rocking lever 25 engages their ends which are distant from the block-contacting ends, and this lever being rockable about a pivot center at 21 which is intermediate its ends, by means of the arm 22, will cause one of the pins 2 to be projected while the other is retracted under the influence of its spring 23, thereby permitting slight, but very limited, rotational movement of a located blade. Adjustable stops 24 limit the amount of rocking of the lever 22. In this rocking of a blade the pin 20 is in effect the fulcrum about which the blade rotates, and this is located very close to the blade's longitudinal axis, so that in effect the blade rotates around that axis.

By thus rocking the blade, it is sometimes possible to lessen the indicated departure of the blade from standard at the several stations to an extent to bring the blade as a whole within the permitted tolerances, and still to find that by varying the orientation of cut of the shank with respect to the chord of the airfoil of the blade, there is enough metal for removal, and to leave a sufficiently accurate blade.

After the gauging operation is completed, the actuator lever 3 is rocked back to its right-hand position of Figure 3. In order to eject the blade which has been gauged more readily, an ejector means is provided. It is for this purpose that the pin 10 is permitted guided vertical movement in the fixed support 9. This ejector movement is accomplished by means of the outer end of the movable support 31 engaging a small rocking lever 16, in order to transmit its rocking movement through the pin 17, and in opposition to the spring 18, to the head which carries the slot 12. This force, acting upon the cross pin 11, projects upwardly the pin 10 and the blade supported thereby.

By this gauging device it is possible to gauge by checking twelve gauge points on the blade accurately, and sufficiently rapidly that one man may gauge one hundred blades or more in an hour, as compared to forty blades a day which was the rate at which these blades were capable of being gauged by the best previously known method. It is evident that there is a great advantage in the use of this gauge. Furthermore, even by the most accurate previous method, the gauging was not always sufficiently accurate to keep the power output within the limited range desired, whereas it has been found that with the present gauge, and with accurate assembly of the halo, it is possible to maintain the power output very close to the desired value.

I claim as my invention:

1. A gauge for determining the accuracy of a forged turbine blade, such as includes a shank with opposite flat faces and an airfoil projecting from such shank, with its longitudinal axis located precisely relative to, and generally parallel to, the shank's faces, both as to the curvature of the concave and convex surfaces of its airfoil and as to the shape and location of its shank relative to such airfoil, said gauge comprising a fixed support; blade-locating devices carried by said fixed support and including a non-yielding member positioned to engage a blade's tip and to constitute, when so engaged, a fixed datum point, a cooperating and yieldable member positioned to engage the shank's base and to urge the blade longitudinally towards the non-yielding member, to constitute with the latter a longitudinal blade-locating means, said blade-locating devices including further a pair of spaced and non-yielding pins fixedly positioned to engage one side of the blade's shank at opposite sides of the blade's longitudinal axis, to constitute, when so engaged, a fixed datum line transverse to the blade's longitudinal axis, and a single yieldable pin positioned to engage the opposite side of the blade's shank, at a location intermediate the paired pins, to urge the shank against the paired pins, and to constitute with the latter a rotational blade-locating means; two shiftable supports, one at each side of the blade's locus as determined by the several blade-locating devices, and guided upon the fixed support for shifting towards and from such locus; gauging devices including a plurality of spring-pressed contact fingers fixedly located upon the respective shiftable supports in position to engage simultaneously the airfoil of a thus-located blade at predetermined gauge points on its opposite surfaces, and gauging members operatively connected to said contact fingers to indicate the conformance of the blade at the several gauge points relative to a predetermined standard; means to shift the shiftable supports simultaneously towards the located blade for gauging, and away therefrom; means to shift the respective cooperating blade-locating devices simultaneously into blade-engaging positions, and therefrom; and common actuating means to shift the movable blade-locating devices into their blade-engaging positions simultaneously with shifting of the gauging devices into gauging position, and vice versa.

2. A gauge as and for the purpose stated in claim 1, including a mount for the paired blade-locating pins, wherein the latter are held slidably in parallelism, a normally fixed rocking lever operatively engaging said pins to hold them normally fixed in position, and alternatively to rock them oppositely and simultaneously, and means to rock said rocking lever for limited adjustment of the transverse datum line about the blade's longitudinal axis.

3. A gauge as and for the purpose stated in claim 1, wherein the shiftable supports are formed as coplanar plates guided on the fixed support in alignment for mutual horizontal approach and recession, an actuating lever directly operatively connected to a first such plate, a rocking lever positioned for engagement by said first plate as it nears its final approach position, and operatively connected to the second such plate to shift the latter towards the first plate until the two plates contact, spring means resisting such approach movement of the second plate; and wherein the non-yielding member of the longitudinal blade-locating means comprises a pin vertically disposed in the fixed support to engage the tip of the blade from below, and the cooperating yieldable member comprises a lever arm mounted on the fixed support and swingable downwardly to engage the shank's base, and a spring-pressed follower carried upon and movable with one of said shiftable plates, and engageable with said lever arm to depress the latter onto the blade's base as the plates near their approach positions.

4. A gauge as and for the purpose stated in claim 3, including a tilting lever located to be engaged and tilted by one of the shiftable plates as the latter nears its fully separated position, and an operative connection from said tilting lever to said vertically disposed pin to move the latter upwardly as an ejector, said pin being guided for such movement in the fixed support.

5. A gauge for determining the accuracy of a forged turbine blade such as includes a shank with opposite flat faces and an airfoil projecting from such shank with its longitudinal axis generally parallel to the shank's faces, both as to the curvature of the surfaces of its airfoil and as to the shape and disposition of its shank relative to such airfoil, which gauge comprises two positioning members relatively movable in the direction of the blade's longitudinal axis, for engagement with the blade substantially at the opposite ends of such axis, to locate the blade longitudinally, but leaving the blade free to rotate limitedly about such axis with respect to said two positioning members, a pair of spaced-apart members at one side of and directed towards the shank, transversely of such axis, a cooperating single transverse member at the opposite side of and directed towards the shank, intermediate the paired members, the paired members and the single member being relatively movable to engage the shank and to rotate the same about the longitudinal axis into a predetermined position, and contact gauge means shiftable into contact with the blade's airfoil, as thus located, at predetermined points, to indicate the locations of the several such points, with respect to intended locations thereof.

6. A gauge as in claim 5, including means to effect conjoint movement of the longitudinal and the rotational positioning means into and from blade-engaging position.

7. A gauge as and for the purpose stated in claim 5, wherein that member which is engageable with the blade's tip is rigid, to constitute, when engaged with a blade, a fixed longitudinal datum point, and wherein the cooperating means engageable with the blade's base is formed as a rocking arm, a support fixed relative to the blade-tip-engaging member, whereon said rocking arm is pivotally mounted, and yieldable means to swing said rocking arm into and from engagement with a blade, to effect approach of said two means for locating the blade between them, or their separation for release of the blade.

8. A gauge as and for the purpose stated in claim 5, wherein the paired members and the cooperating single member are formed as pins, the gauge including a fixed support for said paired pins, wherein they are guided for movement towards and from the base, and means to shift said pins in mutually opposite senses, into further fixed positions, for rotation of an engaged shank about the single pin as a fulcrum.

9. A gauge as and for the purpose stated in claim 5, wherein that member which is engageable with the blade's tip is non-yielding, to constitute, when engaged with a blade, a fixed longitudinal datum point, and wherein the cooperating member which is engageable with the shank's base is yieldable when so engaged, means to effect approach and separation of said two blade-locating members in a direction longitudinally of and for engagement with or release of a blade, respectively; and wherein the two paired shank-engaging contact members which are fixedly positioned in use, to engage a common surface of the shank and to constitute, when engaged, a fixed datum line directed transversely of the shank, and the cooperating single member is yieldable and positioned for engagement with the opposite face of the shank, means to effect approach and separation of said pair of members and said single member in a direction approximately normal to the shank's faces, for engagement with or release, respectively, of the shank which is located longitudinally by the aforesaid two members, to locate the shank rotationally about the airfoil's longitudinal axis, and a common actuator operatively connected to the two approach-effecting means for simultaneous and like actuation of all said blade-locating members.

10. A gauge as and for the purpose stated in claim 9, including means to shift the paired members mutually and relatively oppositely towards and from the engaged shank, to effect limited rotation of a located blade about its longitudinal axis.

11. A gauge as and for the purpose stated in claim 5, including means to effect movement of the several blade-locating members into contact with the blade, and their recession from such blade-contacting position, simultaneously with like movement of the contact gauge means.

12. A gauge as and for the purpose stated in claim 5, including a fixed support whereon are mounted the majority of the several blade-locating members, and two shiftable supports located at opposite sides of a positioned blade, and guided on said fixed support for movement mutually towards and from that blade, the remainder of the blade-locating members being mounted upon one of the shiftable supports, the contact gauge means intended for engagement with the convex face of the airfoil being mounted on one such shiftable support, and those for engagement with the concave face being mounted on the other such shiftable support, and means to shift the two supports mutually towards the blade's location, for engagement therewith of all the blade-locating members and all the contact gauge means, and away from such location, for release of the blade.

13. A gauge for determining the accuracy of a forged turbine blade such as includes a shank having a pair of opposite flat faces and an airfoil projecting from such shank with its longitudinal axis generally parallel to the shank's faces, both as to curvature of the surfaces of its airfoil and as to the shape and disposition of its shank relative to such airfoil, which gauge comprises two positioning members relatively movable in the direction of the blade's longitudinal axis, for engagement with the blade substantially at the opposite ends of such axis, to locate the blade longitudinally, but leaving the blade free to rotate limitedly about such axis with respect to said two positioning members, blade-rotating members directed towards the blade from opposite sides, and engageable with the blade as supported by the first two positioning members to rotate the blade about its longitudinal axis into a predetermined position, a common means to shift both of said positioning means, including certain of the blade-rotating means, substantially simultaneously into operative engagement with the blade, and contact gauge means shiftable into contact with the blade's airfoil, as thus located, to indicate the locations of the several such points of contact, with respect to intended locations thereof.

14. A gauge as in claim 13, wherein said common shifting means is also operatively connected to the several contact gauge means, to shift the latter into blade-contacting positions substantially simultaneously with shifting of the positioning means into blade-engaging positions.

15. A turbine blade gauge as in claim 13, including means operatively connected with certain of the blade-rotating means to rotate the same and its supported blade, by limited amounts about the blade's longitudinal axis.

16. A turbine blade gauge as in claim 13, wherein the shank-rotating means includes a single contact pin positioned to engage one face of the shank adjacent its center, and a pair of contact pins positioned to engage the opposite face of the shank at respectively opposite sides of the single contact pin, and means to push one pin of the pair lengthwise in one sense and the other lengthwise in the opposite sense, to rock the blade about the single pin as a fulcrum, and so to rotate the blade about its longitudinal axis.

17. A gauge for a turbine blade which embodies a shank and an airfoil, comprising a fixed support, two plates guided on said support for mutual edgewise approach and separation, blade positioning means supported on said fixed support, cooperating blade positioning means carried by one of said plates and movable with movement of that plate into position to engage said blade-positioning means with the blade and to move the latter into a definite position, a plurality of contact gauge elements carried by the respective plates, in position to engage a so-positioned blade's airfoil surfaces at a plurality of gauging points, upon full approach of the plates, and by such engagement to indicate any departure of the airfoil at such points from predetermined correct position, or to disengage the supported blade upon separation of the plates, and means movable by an operator to effect approach of the plates, and engagement of the blade by said blade-positioning means, and also engagement of the airfoil surfaces by said contact gauge elements.

References Cited in the file of this patent

UNITED STATES PATENTS

| | | |
|---|---|---|
| 2,018,399 | Engst | Oct. 22, 1935 |
| 2,495,891 | Davis | Jan. 31, 1950 |
| 2,525,267 | Muzzey | Oct. 10, 1950 |
| 2,580,239 | Murch | Dec. 25, 1951 |
| 2,623,295 | Orlandi | Dec. 30, 1952 |
| 2,629,936 | Cronstedt | Mar. 3, 1953 |
| 2,637,908 | Hedman | May 12, 1953 |

FOREIGN PATENTS

| | | |
|---|---|---|
| 369,878 | Great Britain | Mar. 31, 1932 |
| 403,439 | Italy | Apr. 19, 1943 |